UNITED STATES PATENT OFFICE.

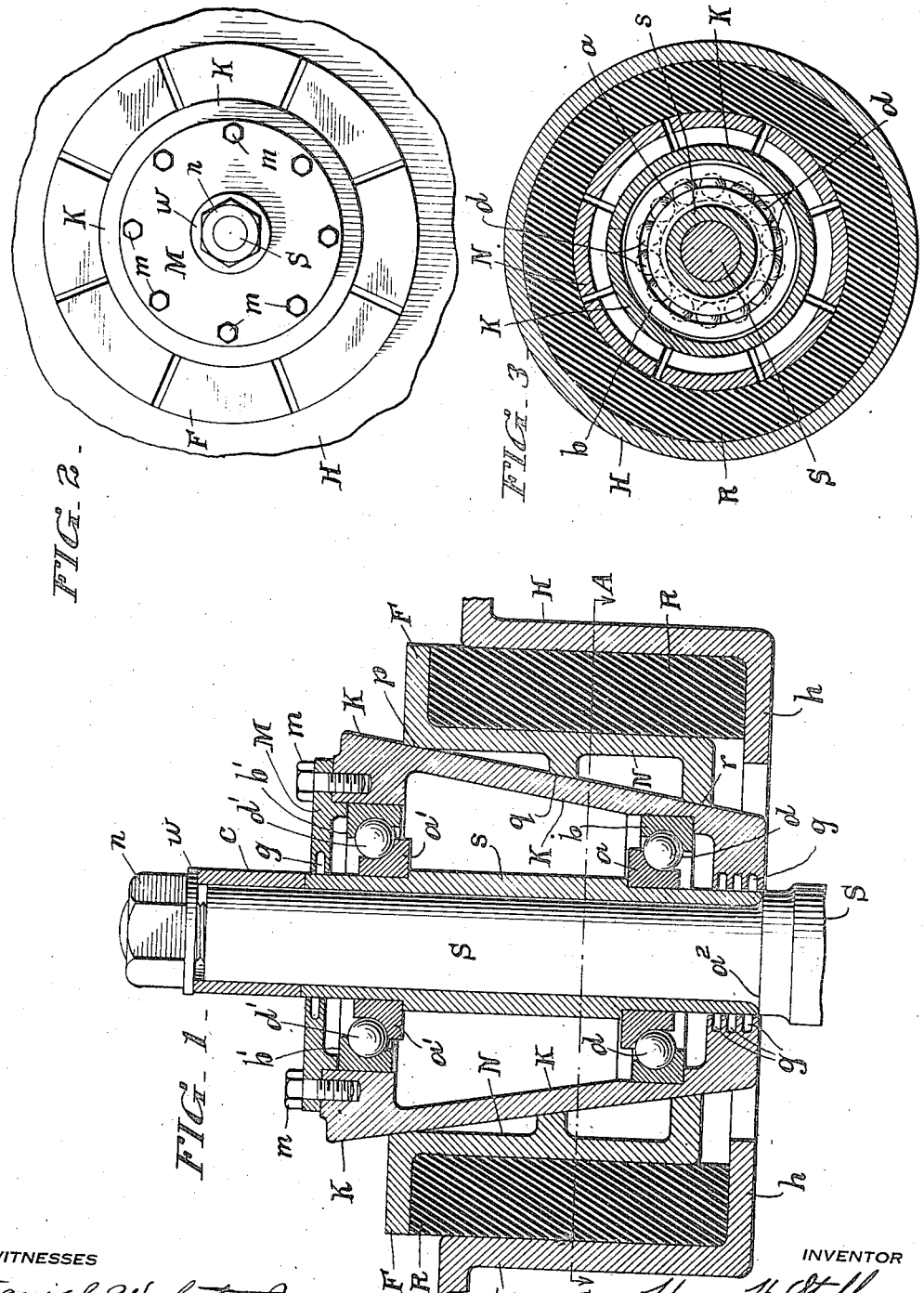

HARRY H. STEPHENS, OF PHILADELPHIA, PENNSYLVANIA.

CENTRIFUGAL HANGER.

1,141,430.      Specification of Letters Patent.      Patented June 1, 1915.

Application filed May 13, 1913. Serial No. 767,255.

*To all whom it may concern:*

Be it known that I, HARRY H. STEPHENS, a citizen of the United States, residing in the city of Philadelphia and State of Pennsylvania, have invented certain new and useful Improvements in Centrifugal Hangers, of which the following is a specification.

My invention relates to means for suspending centrifugal machines comprising the well known drums or baskets which are rotated at high speeds to separate liquids from solids, etc., and which in their operation, due to unsymmetrical loading, vibrate or gyrate.

By my invention I provide a cylindrical rubber or other resilient buffer which resiliently opposes oscillation or gyration of the centrifugal basket and its shaft and which also carries the weight of the basket, shaft and attached parts.

By employing the rubber or resilient material in cylindrical form I procure the results aforementioned with a minimum of wear and deterioration of the rubber or resilient buffer, as distinguished from prior proposed constructions involving rubber or other buffer of conical or conoidal shapes.

My invention resides in the structure hereinafter described and claimed.

For an illustration of one of the forms my invention may take reference is to be had to the accompanying drawing, in which:

Figure 1 is a vertical sectional view, some parts in elevation, through the suspension means for the spindle of a centrifugal machine, such suspension means employing a cylindrical rubber buffer. Fig. 2 is a top plan view, on smaller scale, of parts shown in Fig. 1. Fig. 3 is a horizontal sectional view, on smaller scale, some parts shown in plan, taken on the line A—A of Fig. 1.

Referring to the drawing, S is the spindle which supports the centrifugal drum or basket, not shown. In the example illustrated the suspension is provided for a single spindle drive, that is, the single spindle S is rotated by belt, motor or other suitable means, not shown, and the drum or basket is secured to such spindle S. It is to be understood however that the spindle S may be non-rotatable, in which case the ball or other bearing hereinafter described may be omitted, and a hollow shaft embracing the spindle S may be driven by belt or otherwise and have secured to itself the drum or basket. At its upper end the spindle S may be of reduced diameter as shown and upon this portion of reduced diameter is disposed the sleeve $s$ against whose lower end is drawn the shoulder $a^2$ upon the spindle S by screwing up the nut $n$ screw threaded upon the upper end of the spindle S. Beneath the nut $n$ is the washer $w$ resting upon the top of the collar $c$ which in turn rests upon the upper end of the sleeve $s$. It will be seen that by tightening the nut $n$ the spindle S will be drawn up until its shoulder $a^2$ is snug against the lower end of this sleeve $s$. Upon the sleeve $s$ is a shoulder against which the bearing member $a$ engages, the member $a$ being annular in form and embracing the sleeve $s$. And on a shoulder within the conical member K, engages the annular bearing member $b$, these bearing members $a$ and $b$ receiving between them the bearing balls $d$, the middle of the arc of contact between balls $d$ and member $a$ being at a position higher than the center of the arc of contact between the member $d$ with the member $b$. And against an upper shoulder of the sleeve $s$ rests an annular bearing member $a'$ between which and the annular bearing member $b'$ are disposed the balls $d'$. The annular member $b'$ thrusts against the cover member M secured by bolts $m$ to the top of the conical member K of steel, iron or other suitable material. The cover member M extends close to the sleeve $s$ as shown in Fig. 1, and the lower end of the conical member K is provided with an inwardly extending flange provided with a plurality of grease or oil retaining grooves $g$.

The conical member K rests at a plurality of places as $p$, $q$ and $r$ against the member N whose outer surface is cylindrical and provided with the top flange F.

H is the hanger whose inner wall is cylindrical and which is provided with a bottom flange $h$. Between the outer cylindrical surface of the member N and its flange F and the inner cylindrical surface of the hanger H and its flange $h$ is disposed a cylindrical mass R of rubber or other similar resilient material. The member N is shown divided into a plurality of sections, instead of being circumferentially continuous, though it may be continuous. And member R may be divided circumferentially into a plurality of sections. And in such case, a section of rubber need not have its outer and inner faces cylindrical, but such faces may be only approximately cylindrical, or, indeed they may be parallel planes.

The operation is as follows: The spindle S is driven by belt or motor at the desired speed, thus rotating the attached centrifugal basket or drum. The weight of the spindle and basket is transmitted to the member K from which it is transmitted to the member N and from it through its flange F to the rubber buffer R which in turn is supported by the hanger H. During gyration or oscillation of the spindle S the member N will compress the cylindrically shaped buffer R which thus resiliently opposes such gyration or oscillation. And because of the fact that the buffer R is confined between parallel cylindrical surfaces, the outer surface of member N and the inner surface of the hanger H, there is a minimum of wear upon the buffer R because by this construction there can be only a minimum relative movement between the cylindrical surfaces of the members N and H with respect to the buffer R.

The ball bearings shown are both radial and thrust, the thrust bearings preventing movement of spindle S in either direction longitudinally of member K. And it is to be understood that any other suitable type of bearing, ball or otherwise, may be employed in lieu of that illustrated.

What I claim is:

1. In apparatus of the character described, the combination with a hanger having an internal vertical face, a shaft supporting member divided into a plurality of circumferential sections having external vertical faces, a resilient buffer intervening between the inner face of said hanger and the outer vertical faces of said sections, and a non-expansible shaft bearing member disposed within and engaging said sections.

2. In apparatus of the character described, the combination with a hanger having an internal vertical face, a shaft supporting member divided into a plurality of circumferential sections having external vertical faces, a resilient buffer intervening between the inner face of said hanger and the outer vertical faces of said sections, and a non-expansible exteriorly conical shaft bearing member disposed within and engaging inner conical surfaces of said sections.

3. In apparatus of the character described, the combination with a hanger having an internal vertical face, a shaft supporting member divided into a plurality of circumferential sections having external vertical faces, a resilient buffer intervening between the inner face of said hanger and the outer vertical faces of said sections, a non-expansible shaft bearing member disposed within and engaging said sections, outwardly extending top flanges on said sections engaging the top of said buffer, and an inwardly extending bottom flange on said hanger engaged by said buffer.

In testimony whereof I have hereunto affixed my signature in the presence of the two subscribing witnesses.

HARRY H. STEPHENS.

Witnesses:
 N. B. EVANS,
 A. S. MARSH.